United States Patent [19]

Kremer et al.

[11] Patent Number: 4,975,105

[45] Date of Patent: Dec. 4, 1990

[54] METHOD FOR COATING BAREROOT PLANTS WITH A LIVE MICROBIAL COLONY

[75] Inventors: Douglas A. Kremer, Minnetonka; David E. Peterson, Plymouth, both of Minn.

[73] Assignee: Terra-Verde, Inc., Minn.

[21] Appl. No.: 231,492

[22] Filed: Aug. 3, 1988

[51] Int. Cl.$^5$ ............................................. C05F 11/08
[52] U.S. Cl. ................................................ 71/6; 71/7; 71/904; 47/57.6; 47/58; 424/93
[58] Field of Search ................. 71/6, 7, 904; 47/57.6, 47/58; 424/93

[56] References Cited

U.S. PATENT DOCUMENTS 4,583,3270  4/1986  Redenbaugh ........................... 47/58

Primary Examiner—William R. Dixon, Jr.
Assistant Examiner—David M. Brunsman
Attorney, Agent, or Firm—Kinney & Lange

[57] ABSTRACT

The present invention provides a method for developing a culture of microorganisms in the rhizosphere of plants by dipping roots of the plants in a hydrated super absorbant polymer containing living microorganisms, thereby adhering the polymer to the roots.

31 Claims, No Drawings

METHOD FOR COATING BAREROOT PLANTS WITH A LIVE MICROBIAL COLONY

FIELD OF THE INVENTION

The invention relates to coating of bare plant roots with a microorganism containing fluid prior to planting and more particularly with a method for applying to bare roots a super absorbant polymer in a hydrated condition and containing a living microbial colony. The colony may be a mixed colony.

BACKGROUND OF THE INVENTION

It has long been known that certain microbial materials are advantageous in the rhizosphere of plants. For example, Rhizobium is one such microbial material. U.S. Pat. No. 4,155,737 (Dommergues, et al.) shows Rhizobium embedded in a polyacrylamide gel. The gel has a low water content and may be crushed to a particulate form. The particles may be disbursed in soil. This is generally referred to as soil inoculation. A wide variety of other microbial materials have been similarly used, for example, ectomycorrhizal fungus has been entrapped in a polymeric gel. A clay is added to the gel to result in a solid microgranule product. This product may be disbursed in a bed of seedlings and the fungus stimulates the growth of the seedlings. *Efficiency in a Forest Nursery of an Ectomycorrhizal Fungus Inoculum produced in a Fermentor and Entrapped in Polymeric Gels,* Tacon, Jung, Mugnier, Michelot and Mauperin, 1985, Can. J. Bot. 63:1664–1668. While prior methods have been somewhat effective, such methods have had inherent shortcomings. For example, the microorganisms tend to be inactive and do not multiply significantly in the low moisture granules. Also the plant roots must grow, extending their root systems, before they encounter the granules, thus the plant is slow in initiating the symbiotic relationships.

GENERAL DESCRIPTION OF THE PRESENT INVENTION

In the present invention a polymer is prepared in a viscous fluid condition which may be referred to as a gel or suspension. The polymer desirably is a super absorbant polymer such as polyacrylamide, polyacrylates, modified starch, or a co-polymer which may include polyacrylamide. The hydrated polymer may be inoculated with a microbial material such as a Rhizobium or an ectomycorrhizal fungus. The microbes may be permitted to grow and develop in the fluid. Seedlings may be carefully removed from their growing containers and growing medium may be rinsed from the roots. If desired, the roots may be trimmed.

The seedlings are root dipped in the polymer fluid, for example up to five seconds, and then permitted to drain for a few seconds. If desired the plant roots may remain in the polymer for an extended period of time without adverse effect. The seedlings may then be transferred to a suitable growing medium. For example, the seedlings may be transferred into pots containing suitable potting mixture such as vermiculite and peat moss where they are grown under suitable conditions of lighting and water. Alternatively, the root dipped seedlings may be planted in other suitable growing environment such as soil.

The present method has many advantages over the methods previously used. The present invention applies the microbes to the plant roots in the form of a strong growing culture which provides a more rapid start up of the plant and quickly establishes symbiotic relationships. The microorganisms are in direct contact with the roots. The coating of the roots with the hydrated polymer serves to minimize shock at the time of planting, e.g., since the super absorbant polymer carries a large quantity of water, the roots do not become desiccated. The polymer adheres to the roots protecting them from drying winds and temperatures as they are moved to their individual planting locations. After planting the polymer will release the moisture to the roots of the plant, thus serving as a moisture reservoir.

The polymer remains adjacent to the roots as growth takes place, thereby assisting in the continued development of the microbial colony in the rhizosphere, more particularly in the rhizoplane. In other words, the system is more efficient and effective since the microorganisms are concentrated in the zone where they are directly accessible by the roots rather than dispersed throughout the soil. The super absorbant polymer stores water following rain or irrigation, thus serving as a water reservoir in the intermitant dry periods between rains and/or irrigation.

It is to be recognized that although certain microbial materials are identified herein, any desirable microorganisms which will live in an aqueous environment to facilitate plant growth and root development may be used in the present method. For example, any and all microorganisms that develop a beneficial symbiotic relationship with the root systems of plants, for example as listed in the *Catalogue of Bacteria Phages rDNA Vectors,* Sixteenth Edition 1985, Gherna et al. may be used in the present invention. Similarly, various beneficial microorganisms listed in *American Type Culture Collection Catalogue of Strains II,* Fourth Edition 1983 may be used in the present invention. Further, the various beneficial microorganisms listed in the *ATCC Catalogue of Fungi/Yeasts,* 17th Edition, 1987 may be used in the present invention.

DETAILED DESCRIPTION OF THE PRESENT INVENTION

The present invention contemplates preparation of a suspension of gelatinous particles of super absorbant polymer. Suitable polymers include polyacrylamides, polyacrylates, modified starch, as well as copolymers, for example, a copolymer of vinyl alcohol and the sodium salt of acrylic acid. While the following description identifies specific super absorbant materials, the suspension forming composition may include any super absorbant polymer that will serve as a vehicle to physically support living microorganisms and adhere to roots.

The present invention contemplates preparation of a suspension from swollen particles of a polymer based super absorbant. Suitable polymers include synthetic polymers such as polyacrylamide and sodium polyacrylate as well as natural polymers such as starch and modified starch based polymers. Additional suitable polymers include copolymers of acrylamide/sodium acylate or vinyl alcohol/sodium acrylate and graft copolymers between natural and/or synthetic polymers. In all cases, the polymers are lightly crosslinked by means of a suitable crosslinking agent. While the following description identifies specific super absorbant materials, the invention allows for the use of any super absorbant polymer that will serve as a vehicle to support living microorganisms and adhere to plant roots.

One preferred such composition is polyacrylamide which is lightly crosslinked with N,N'-methylene-bis(acrylamide). A typical commercially available product is sold by Allied Colloids, Inc. of Suffolk, Va. under the designation of Alcosorb AB3. The product consists of a substantially non-ionic, crosslinked polyacrylamide gel capable of absorbing up to 400 times its own weight in water. Hydration of the polymer gel results from solvation of the polar sidechains of the acrylamide subunits. Total solubilzation of the polymer would result in the absence of the crosslinking. The absorbed water is strongly held in the pores of the swollen polymer matrix by hydrogen bonding. As such, the water is retarded from loss due to percolation into the soil or thru evaporation to the atmosphere and thus maintained in a zone useful to plants when the super absorbant is used as described in the invention. Accessability of the absorbed water to plants is very high with more than 95% of the water reportedly available. The absorbed water may be at least 30 times preferably 300 to 400 times the weight of the polymer. For example the water content may be as high as 1500 times the weight of the polymer.

Another suitable material consists of sodium polyacrylate. This material is also lightly crosslinked to provide for the formation of a gel upon hydration. A commercially available super absorbant polymer of this type is sold by Stockhausen, Inc. of Greensboro, N.C. under the designation of Favor SAB 922. When brought into contact with water, the carboxylate groups of the acrylate subunits are solvated and dissociate into negatively charged carboxyl ions. Since the polymer contains a large number of these similarly charged ionic groups which repel each other, the polymer coils become more bulky and thus extend their propensity to absorb water. As before, hydrogen bonding is involved in strongly holding the water in the gel.

Further suitable super absorbant composition for use in the present invention is a copolymer of vinyl alcohol and acrylic acid in the form of a sodium salt. A commercially available product of this copolymer is Igeta-Green P, available from Sumitomo Chemical Co., Ltd., of Osaka, Japan. This product will absorb up to approximately 500 times its own weight in water. The product is available in a solid granule form with a moisture content of about 7 percent. Terra-sorb TM is a further super absorbant gel that may be used in the present invention. Terra-sorb is a hydrolized starch/polyacrylonitrile graft copolymer which is available from Industrial Services International of Brandenton, Fla. A further suitable super absorbant polymer is a hydrolized starch-polyacrylate available from Grain Processing Corp., Muscatine, Iowa, under the designation Waterlock.

Any material that is suitable for absorbing large quantities of water which upon such hydration forms a gel or viscous aqueous suspension is suitable for use in the present invention, providing the gel is stable and will provide suitable living environment for the desired microbial life. The gel desirably is biodegradable over time, e.g., 1 to 120 months depending on its use.

While the present composition is described as a hydrated gel or suspension it should be recognized that it is made up of a large number of hydrated spheres. For example, the polymer granules may have a particle size in the range of 50 to 400 microns prior to hydration and a particle size of 0.5 to 4.5 millimeters when hydrated.

The hydrated spheres desirably are sticky to facilitate adherance to the roots of the plants. The hydrated composition is in the form of a large mass of adhering spheres prior to root application. When plant roots are dipped into the hydrated polymer the spheres adhere to the roots.

The microbes of the present invention may be any specie of microorganism or combination of species of microorganisms which will assist the plant growth through association with the plant roots. Microorganisms such as bacteria, bacteriophages, fungi, actinomycetes, and yeasts are suitable.

The microorganisms may be present in the hydrated polymer in an amount of 0.0025% to 15%, preferably 0.0125% to 0.05%, on a volume to volume basis. In the case of bacteria, the microbes may be present at a level of $10^6$ to $10^9$ per 1.0 ml. Illustrative microorganisms used in the present invention include Rhizobium, *Rhizopogon lutealus,* Frankia, Pseudomonads, Bacillus, Monilacease, Candida, *Suillus luteus, Pisolithus tinctorius,* Thelephora terrestris, Laccaria laccata, Cenococcum geophilum, *Aspergillus ficuum,* Trichodemaharzianum, *Amanita muscaria,* Amanita pantherina, Amanita porphyria. Boletus edulis, Boletus luridus, Boletus badius, Boletus subtomentosus, Clitopilus prunulus, Fuscoboletinus aeruginascens, Lactarius deliciosus, Leccinum testaceoscabrum, Lyophyllum fumosum, Paxillus involutus, Piloderma croceum, Rhizopogon roseolus, Suillus bovinus, Suillus qanulatus, Suillus grevillei, Suillus placidus, Suillus tridentinus, Rhodoturula, *Hebeloma crustuliniforme, Pleurotus cornucopiae, Pleurotus strigosus, Hohenebuehlia grisea, Dactylella bembicoides, Arthrobotrys oligospora,* and others.

One highly effective microorganism for use in the present invention is ectomycorrhizal fungi. The gel containing the ectomycorrhizal fungi is suitable for dipping tree roots prior to planting, particularly in adverse soil conditions such as mine tailings, poor soil or areas to be forested. The fungal colony in the gel serves to improve moisture relations and nutrient uptake from the soil. This is of particular advantage to plants in overcoming the shock of transplantation resulting in the establishment of a vigorous root system that contributes to the increased growth rate of the plants.

Nitrogen fixing organisms are also of importance in the present invention. For example, the bacterial genus Rhizobium in association with Leucaena in the hydrated gel is a preferred embodiment of the present invention. Similarly, the Actinomycete genus Frankia in association with Alnus serve as nitrogen fixers when used in the gel of the present invention. Other suitable nitrogen-fixing bacteria include Azobacter, Beyerinckia, Clostridium, *Bacillus polymyxa, Aerobactor aerogens, Klebsiella pneumoniae,* Pseudomonas, *Methanobacterium omelionski,* Achromobacter, Spirillum, Mocrococcus, and Derxia. Use of the root dipping method of the present invention in the nitrogen fixation embodiments lowers the cost of fertilization and is particularly advantageous in hard to fertilize areas such as long term large tree plantations or reforestation of rough terrain.

Another group of microorganisms that find advantage in the present invention are those microorganisms that inhibit the growth of various potentially plant pathogenic microorganisms. An example of one such microorganism is the bacterial genus Pseudomonas.

Another group of microorganisms that are advantageous in the present root dipping method include microorganisms that result in insect and nematode protection for the plants. One such bacterial material is *Bacillus thuringiensis*. *Bacillus thuringiensis* is of particular advantage for its insecticidal properties. Another such microorganism family is Monilacese which serves to inhibit nematodes.

The present gel further includes suitable nutrient for the selected microbial material. For example, a mixture of malt extract and D-glucose, are suitable nutrients. Other materials that may be included as nutrients are diammonium phosphate, monopotassium phosphate, magnesium sulfate, calcium chloride and the like.

While certain detailed and preferred embodiments have been disclosed, various modifications may be made without departing from the broader scope of the present invention. For example, the gel may be color coded to indicate the microorganism present.

EXAMPLE 1

The fungal isolate may be prepared from *Suillus luteus* (Isolate number 244). The fungal isolate may be first grown as an agar culture in petri dishes for three to four weeks. A liquid culture may be then prepared by disbursing the fungal material into sterilized bottles containing 500 milliliters of nutrient solution. The nutrient solution included 0.3 percent malt extract, 1.0 percent D-glucose, 0.025 percent diammonium phosphate, 0.05 percent monopotassium phosphate, 0.015 percent magnesium sulfate, 0.005 percent calcium chloride, 0.002 percent sequestrene and 0.0001 percent thiamine HCL all dissolved in distilled water. The culture bottles contained pieces of broken glass. The liquid cultures may be grown for six weeks at 20 degrees centigrade. At various times throughout the growth period the bottles may be hand shaken for aeration. A hydrated gel may be prepared by combining one pound of polyacrylamide with 18 gallons of water. Sufficient fungus liquid culture may be added to provide a 0.01 percent volume to volume *Suillus luteus*. The amount of microorganisms present may be measured by filtration using a 0.45 micron filter to separate the microorganisms from the medium. Scotch Pine tree seedlings may be dipped in the polymer resulting in the adhesion of 0.25 grams polymer composition per tree. The trees may be then planted in pots containing a mixture of 1:1 vermiculite and peat moss rooting medium. The containers may be placed on a bench and provided each day with 12 hours of artificial light equivalent to sunlight. The seedlings may be watered three times week and no fertilizer added. After 25 days of growth the seedlings may be removed from the containers. The roots may be rinsed free of growing medium. The roots may be visually assessed for ectomycorrhizal development. Improved results will be obtained.

EXAMPLE 2

Example 2 was repeated as a field test, however the fungal species used was *Pisolithus tinctorius* (Isolate number 2). In this case one pound of polymer was hydrated with 20 gallons of water. The fungus ratio in the hydrated polymer was 0.005 percent by volume. Scotch Pine tree seedlings were dipped resulting in a coating of 0.23 grams polymer composition per tree seedling. The seedlings were similarly planted, grown for one month, and examined.

EXAMPLE 3

Example 2 was repeated as a field test, however the fungal species used was *Laccaria laccata* (Isolate number 813).

EXAMPLE 4

Example 1 was repeated, however the polymer was in the form of a concentrate containing two gallons of water per pound of polymer. The fungus was likewise in a concentrated form of 0.15 percent by volume. This concentrated mix was then transported to the field where tree seedlings were to be planted. The concentrate was then diluted with water to a final volume of 10 times its original concentrated volume. The diluted mixture was thoroughly dispersed to assure adequate distribution of the fungal hyphae. Scotch Pine tree seedlings were bare root dipped in the polymer composition and planted in the soil.

EXAMPLE 5

Example 1 may be carried out, however substituting the bacteria genus Rhizobium for the fungal material. The Rhizobium serves as a nitrogen fixation agent. Tree seedlings may be bare root dipped in the resulting composition and planted in adverse soil conditions.

EXAMPLE 6

Example 1 may be repeated, however using the bacterial genus Pseudomonas instead of the fungal material. Tree seedlings may be bare root dipped and planted in soil. The root dipping prevents and/or minimizes the development of plant pathogenic microorganisms.

EXAMPLE 7

Example 1 may be repeated, however utilizing the bacterial genus Bacillus in place of the fungal material. Plants may be bare root dipped in the resulting hydrated polymer and planted in soil. The resulting plants establish quicker and more healthy growth.

While numerous specific examples of polymers and microorganisms have been identified herein, it is to be recognized that various modifications can be made without departing from the present invention. Any of various combinations may be used, for example, mixtures of fungus and bacteria.

EXAMPLE 8

The present invention was carried out substantially as described in Example 1 using a gel of *Pisolithus tinctorius* on two year old Scotch Pine seedlings. The seedlings were separated into five uniform sets or groups of seedlings. Group A was a control and received no application of polymer. Group B received a root dipping in hydrated polymer which had no microbial colony present. Group C received a root dipping in hydrated polymer which had a 0.005% volume to volume inoculation of *Pisolithus tinctorius*. Group D received a root dipping in hydrated polymer which had a 0.025% by volume inoculation of *Pisolithus tinctorius* Group E received a root dipping in a hydrated polymer which had a 0.075% by volume inoculation of *Pisolithus tinctorius*. Each of the seedling groups were grown in a one to one mixture of peat and vermiculite for six weeks. Each of the groups were given an equal amount watering and light. After six weeks the seedlings were removed and the roots were examined for degree of development of the root fungal mantel. Groups A and B had essentially no development of fungal mantel. Group C had about 9% of the root surface with the fungal mantel developed. Group D had about 48% of the root surface with the fungal mantel developed. Group E had about 46% of the root surface with the fungal mantel developed.

What is claimed is:

1. A method for providing plants with a microbial colony for association with the roots of the plant, said method comprising forming a hydrated super absorbant gel including a polymer and water, said polymer being a member selected from the group consisting of synthetic polymers and natural polymers, said composition having a water content of from at least 30 times the weight of said polymer, said gel including microbial nutrient, combining at least one microbial colony with said gel, dipping the roots of said plants in said microbe containing gel to adhere said gel to said roots, planting said roots in a growing medium.

2. The method of claim 1 wherein said composition has a water content of from 300 to 500 times the weight of said polymer.

3. The method of claim 2 wherein said polymer is a member selected from the group consisting of natural polymers.

4. The method of claim 2 wherein said polymer is a member selected from the group consisting of polyacrylamide, polyacrylates and polyacrylate salts.

5. The method of claim 4 wherein said microbial colony is multiplied in said gel prior to said root dipping.

6. The method of claim 2 wherein said polymer is a copolymer of acrylamide and sodium acrylate.

7. The method of claim 2 wherein said polymer is a copolymer of vinyl alcohol and sodium acrylate.

8. The method of claim 1 wherein said polymer is a graft copolymer of natural polymer and synthetic polymer.

9. The method of claim 2 wherein said polymer is polyacrylamide lightly crosslinked with N,N'-methylene-bis(acrylamide).

10. The method of claim 1 wherein said microbial colony is a nitrogen fixer.

11. The method of claim 1 wherein said microbial colony is selected from the group consisting of Rhizobium, *Rhizopogon lutealus*, Frankia, Pseudomonads, Bacillus, Monilacease, *Pisolithus tinctorus*, *Thelephora terrestris*, *Laccaria laccata*, Candida, *Cenococcum geophilum*, *Aspergillus ficuum*, and *Suillus luteus*.

12. The method of claim 1 wherein said microbial colony is a mixture of at least two species of microorganisms.

13. The method of claim 12 wherein said microbial colony is Rhizobium.

14. The method of claim 12 wherein said microbial colony is Frankia.

15. The method of claim 1 wherein said microbial nutrient comprises a mixture of malt extract and D-glucose.

16. The method of claim 2 wherein the microbial colony provides protection against insects and nematodes.

17. The method of claim 2 wherein said microbial colony provides protection against plant pathogenic microorganisms.

18. A method for providing plants with a microbial colony for micorrhizal association with the roots of the plant, said method comprising forming a hydrated super absorbant gel including a polymer and water, combining at least one species of microoganism with said gel, dipping the roots of said plants in said gel and microoganism combination to adhere said gel to said roots.

19. The method of claim 18 wherein said gel comprises hydrated spheres having a particle size of between 0.5 and 4.5 millimeters.

20. The method of claim 19 wherein said spheres are sticky.

21. The method of claim 20 wherein said plants comprise tree seedlings.

22. The method of claim 21 wherein said microorganism is at least one member selected from the group consisting of bacteria, bacteriophages, fungi, actinomycetes, and yeasts.

23. A method of providing plants with a microbial colony associated with the roots of the plant, said method comprising forming a hydrated super absorbant gel including a polymer and water, combining at least one microbial colony with said gel, dipping the roots of said plant in said gel and microbial combination to adhere said gel to said roots, planting said roots in a growing medium.

24. The method of claim 23 wherein said composition has a water content of from 30 to 1500 times the weight of said polymer.

25. The method of claim 24 wherein said polymer is a member selected from the group consisting of synthetic polymers and natural polymers.

26. The method of claim 25 wherein said polymer is a member selected from the group consisting of polyacrylamides and polyacrylates.

27. The method of claim 25 wherein said polymer is a member selected from the group consisting of modified starches.

28. The method of claim 5 wherein said microbial colony is at least one member selected from the group consisting of Rhizobium, *Rhizopogon lutealus*, Frankia, Pseudomonads, Bacillus, Monilacease, *Pisolithus tinctorus*, *Thelephora terrestris*, *Laccaria laccata*, Candida, *Cenococcum geophilum*, *Aspergillus ficuum*, and *Suillus luteus*.

29. The method of claim 28 wherein said gel includes microbial nutrient.

30. The method of claim 27 wherein said microbial colony is an ectomycorrhizal fungus.

31. The method of claim 25 wherein said microbial colony is at least one member selected from the group consisting of *Amanita muscaria*, *Amanita pantherina*, *Amanita porphyria*, *Boletus edulis*, *Boletus luridus*, *Boletus badius*, *Boletus subtomentosus*, *Cenococcum geophilum*, *Clitopilus prunulus*, *Fuscoboletinus aeruginascens*, *Lactarius deliciosus*, *Leccinum testaceoscabrum*, *Lyophyllum fumosum*, *Paxillus involutus*, *Piloderma croceum*, *Pisolithus tinctorius*, *Rhizopogon roselous*, *Suillus bovinus*, *Suillus granulatus*, *Suillus grevillei*, *Suillus luteus*, *Suillus placidus*, *Suillus Tridentinus*, Rhodoturula, *Hebeloma crustuliniforme*, *Pleurotus cornucopiae*, *Pleurotus strigosus*, *Hohenebuehlia grisea*, *Dactylella bembicoides*, *Arthrobotrys oligospora*.

\* \* \* \* \*

UNITED STATES PATENT AND TRADEMARK OFFICE
CERTIFICATE OF CORRECTION

PATENT NO. : 4,975,105

DATED : December 4, 1990

INVENTOR(S) : Douglas A. Kremer et al.

It is certified that error appears in the above-identified patent and that said Letters Patent is hereby corrected as shown below:

On the title page:

In the References Cited Section, under U.S. PATENT DOCUMENTS, delete 4,583,3270, insert --4,583,320--

Signed and Sealed this

Nineteenth Day of May, 1992

*Attest:*

DOUGLAS B. COMER

*Attesting Officer*     *Acting Commissioner of Patents and Trademarks*